United States Patent Office 2,952,468
Patented Sept. 13, 1960

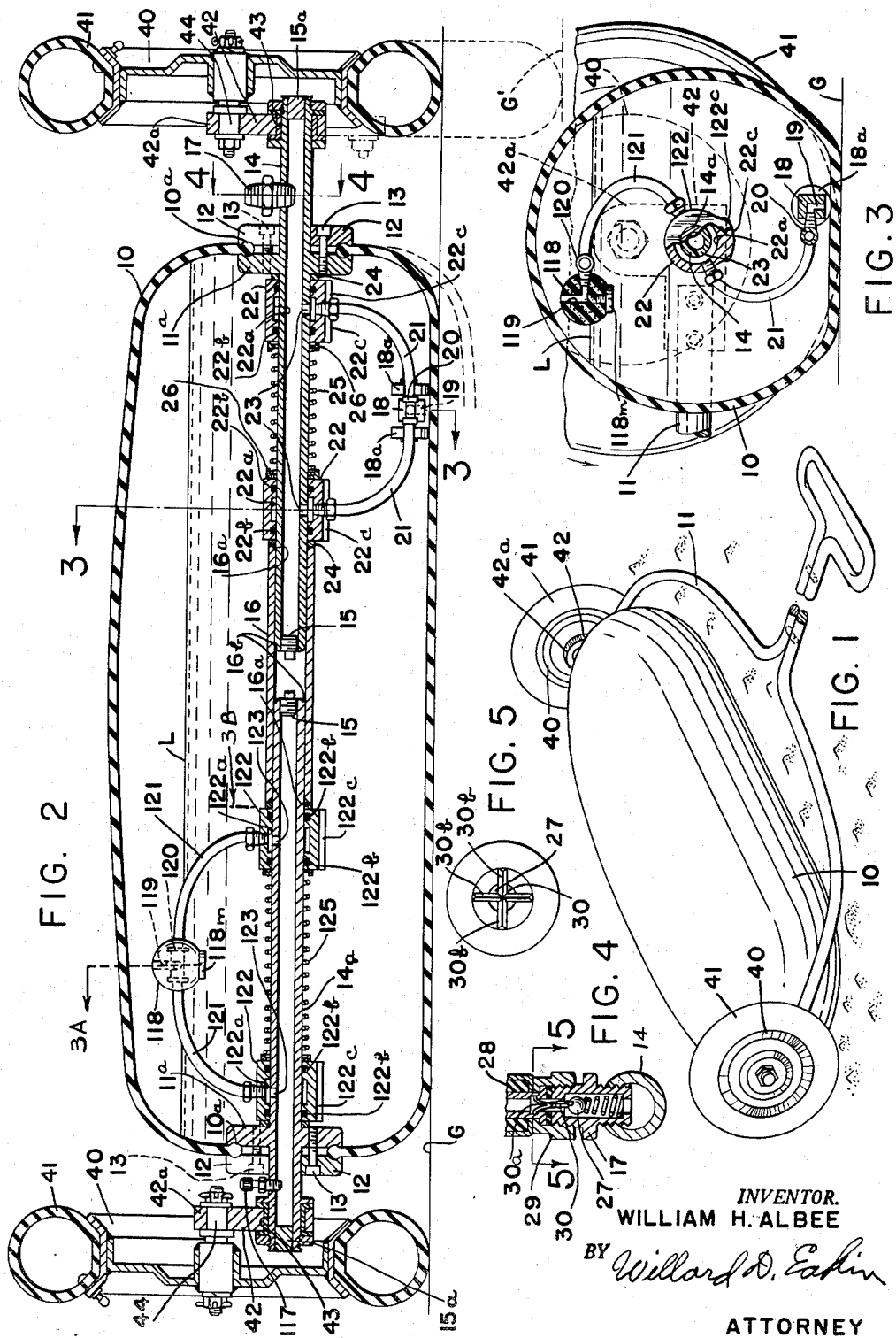

2,952,468

APPARATUS FOR CONVEYING A LIQUID OR OTHER FLUID

William H. Albee, Carmel, Calif., assignor, by mesne assignments, to John G. Holland, Houston, Tex.

Filed Feb. 23, 1956, Ser. No. 567,137

8 Claims. (Cl. 280—5)

This invention relates to a vehicle comprising a hollow, flexible-walled, fluid-distensible, ground-contacting and load-carrying roller adapted for the use of a cargo fluid as the roller-distending substance, or as a part of it, and to a method of using such a roller.

Its chief objects are to provide economical transportation of a liquid or other fluid, especially over rough terrain or over a soft supporting surface such as that of snow, desert sand or marshy ground.

Further objects are to provide a vehicle adapted for use in a river, lake, bay or other body of water as a floating surface vessel, or as a sunken vehicle supported in part by contact with the floor of the body of water, and as an amphibious vehicle.

Another object is to provide a vehicle of the type above indicated adapted to transport even a large amount of a heavy liquid over desert sands, for example, without leaving any clearly visible track, which is of especial advantage in the case of military use.

Further and more specific objects will be manifest in the following description.

I attain these objects by providing a roller of the type indicated with provision for filling or partly filling it rapidly with a cargo liquid or other fluid and for emptying it of the same, and preferably with provision of other features of which the advantages will be manifest.

The roller itself and some of the associated parts are somewhat similar to the structures described in my U.S. Patent No. 2,714,011, and in my copending U.S. application Serial No. 430,179, filed May 17, 1954, and since issued as Patent No. 2,802,541, the roller being adapted to perform its functions with very low internal pressure, in the neighborhood of 2 to 5 pounds per square inch, for example, so that it will locally "swallow" roadway projections or obstructions, without their causing high resistance to its forward movement.

Of the accompanying drawings:

Fig. 1 is a perspective view of the preferred embodiment of the invention of the present application.

Fig. 2 is a longitudinal, axial section of the same.

Fig. 3 is a section of the same approximately on the indirect and discontinuous line 3—3 of Fig. 2, with a part broken away and with parts sectioned on lines 3A and 3B of Fig. 2 to show the structure of elements at different distances from the point of view.

Fig. 4 is a section on line 4—4 of Fig. 2.

Fig. 5 is a section on line 5—5 of Fig. 4.

The preferred embodiment here shown comprises a flexible-walled hollow roller body 10, preferably of rubber-and-cord construction generally similar to that commonly used in the construction of pneumatic tires, but with preferably a thin and highly flexible, and only moderately stretchable wall, an axle structure mounted in the roller at its axis and having parts projecting from the ends of the roller, and horizontal-propulsion means in the form of a pulling yoke 11 having its arms journaled respectively to the projecting parts of the axle structure.

The roller body, preferably of crowned shape as shown in the drawings, is formed at each end with a central hole defined by an anchorage bead $10^a$. Each bead is clamped against and thus sealed to a flange $11^a$ constituting a part of the axle structure, by means of a plurality of clamping-ring segments 12, 12 which are drawn toward the flange $11^a$, to clamp the bead $10^a$, by bolts 13, 13, at positions between the roller's axis and the bead $10^a$.

Preferably each of the flanges $11^a$, $11^a$ is an integral part of a tubular axle member 14 or $14^a$, which members provide the outwardly projecting axle structures for the journaling of the yoke arms thereon. In the other direction each axle member 14 or $14^a$ projects in the interior of the roller and is provided at its inner end with a closure plug 15 and at its outer end with a closure plug $15^a$.

To maintain alignment of the two axle members 14, $14^a$ while permitting them to move toward and from each other a little as the shape of the roller changes slightly in service the inner end portion of each axle member 14 or $14^a$ is slidably telescoped in the adjacent end portion of a guide and stop sleeve 16.

A hose coupling 17, outside of the roller, is screwed through a wall of the hollow axle member 14 for conducting cargo fluid into and out of the latter. To provide for the substantially complete emptying of a cargo liquid from the roller, under the force of fluid pressure within the roller, a filling and venting nozzle 18, formed with an L-shaped fluid passage 19, is adapted to be held by gravity with its mouth at substantially the lowest part of the interior of the roller, in spite of the rotation of the roller in the transportation of the liquid.

The nozzle 18 preferably is provided with a pair of wheels $18^a$, $18^a$, to prevent rotation of the roller from dragging the nozzle away from its low position.

The preferred structure for connecting the nozzle to the hollow axle member comprises a T-coupling 20 mounted on the nozzle with its hollow stem in communication with the passage 19 and a pair of resiliently flexible hoses 21, 21, preferably mold-vulcanized to about the C shape in which they are shown, connecting the respective arms of the T-coupling with respective fluid-conducting, rotary-seal sleeves 22, 22 mounted upon the axle member 14 for rotation of the latter within them.

Each sleeve 22 is internally formed with an annular groove $22^a$ of sufficient axial width to assure constant communication of the groove with a respective hole 23 formed in the wall of the axle member, in spite of variations in the curvature of the C-spring hoses 21 under variation of their internal pressure or as the result of contact of the wall of the roller with roadway obstructions, or pronounced or unlike deformations of the end portions of the roller, as in the case of a lateral sloping of the roadway. At each side of the groove $22^a$ the sleeve preferably is rotatably sealed to the axle member by a rubber O-ring or "soft packing" ring $22^b$ set in a groove in the inner face of the sleeve. The sealing rings, being of a self-energizing type, can fit the axle member with such moderate pressure that rotation of the axle member will not bunch or excessively wear the ring, but such that the ring will effectively seal against the axle member under the force of substantial differential pressure incident to the filling or the emptying of the roller, with the axle member being not rotating at such times as the roller is being filled or emptied while standing still, or with the axle rotating as a part of the roller, as in the case of a towing vehicle being refueled, in transit, from liquid carried in the roller.

Preferably each of the fluid-conducting sleeves 22 is provided with a relatively heavy lower part, at $22^c$, to supplement the weight of the hose and nipple structure to prevent rotation of the sleeve.

For holding the sleeves in their proper positions axially of the assembly, against respective soft-metal washers 24, 24 bearing against the guide-sleeve 16 and the flange 11ª respectively, a light helical spring 25 surrounds the axle member and is seated at its ends against spring-seat washers 26, 26 which bear against the respective fluid-conducting sleeves 22, 22.

As shown in Fig. 4, the inlet-outlet hose coupling 17 has within it a spring-backed, inwardly opening ball valve 27, to confine the contents of the roller when it is not being filled or emptied.

For opening the ball valve automatically when a hose 28 is connected to the coupling 17, the swivel screw-coupling of the hose 28 comprises a nipple 29 within the end of the hose and internally formed with an annular groove for seating and stabilizing the ends of the arms of a spring-metal spider 30 having a ball-engaging stem 30ª for forcing the ball 27 off of its seat. The spider can be formed, as shown in Fig. 5, by making crossed saw-cuts in the end of a metal rod and bending outward the four resulting arms 30ᵇ, 30ᵇ.

With suitable changing of the internal capacity of the roller by collapse and distension, it can be almost completely filled with and emptied of liquid through the hose-coupling 17 and its associated conduits alone, successive charges of air being conducted into the roller from time to time through those conduits to provide internal air pressure for forcing out the liquid.

Preferably, however, provision is made for venting air from the interior of the roller while liquid is being conducted into it, for almost complete filling of the roller with liquid if desired, and for conducting compressed air into the roller while liquid is being conducted out of it.

To provide such mode of operation the assembly here shown comprises elements mounted upon the axle member 14ª and including a buoyant member 118 adapted to float upon the liquid, the surface level of which is represented by the horizontal line L, and the float is formed with an L-shaped fluid passage 119 and a T-coupling 120 having its stem in communication with the said passage and its arms coupled to respective hoses 121, 121 of C-spring shape and corresponding to the hoses 21, 21 above described. The hoses 121 are coupled at their other ends to respective fluid-conducting sleeves 122, 122 provided with sealing rings 122ᵇ, 122ᵇ, the sleeves corresponding to the sleeves 22, 22 except that their weighting elements 122ᶜ, 122ᶜ, are in such position as to supplement the buoyancy of the hoses 121, 121 and the member 118 for maintaining the fluid-conducting sleeves in proper angular positions as the member 118 moves upward or downward with the surface of the liquid. Other elements corresponding to those above described for the liquid-conducting assembly include a light helical spring 125 and each sleeve is formed with an internal annular groove 122ª which is always in communication with a hole 123 in the wall of the hollow axle member 14ª, the inner end of which is provided with a closure plug 15 and its outer end with a closure plug 15ª as above stated.

A metal inflating-valve stem, 117, with a valve in it corresponding to a tire valve, is screwed through a wall of the hollow axle member 14ª, outside of the roller. For charging the roller with compressed air to expel the liquid an air hose can be applied to the valve-stem 117 as in the inflating of a tire, and for the venting of air from the roller to permit the roller to be filled almost completely with liquid, the valve can be held open by any suitable means or the valve "insides" can be removed, as in the case of quick deflation of a tire.

In the rotation of the roller as it is pulled along by means of the yoke 11 in the transportation of the fluid, the weight of the nozzle member 18 and of the heavy sides of the conducting sleeves 22, 22 maintains the nozzle member with its mouth at substantially the lowest part of the interior of the roller, the hoses 21, 21 having but little if any buoyancy, because of being filled with liquid. The C-spring shape of the hoses 21, 21, preferably given to them by mold-vulcanization, permits the nozzle member to rise and fall in relation to the axis of the roller as the wall of the roller is changed in shape by road obstructions, by change in the amount of liquid contained in the roller, or by change of the pressure of the cushioning body of air over the liquid.

The air-conducting structure 118—123 similarly is held in its operative position by the weight of the heavy sides of the conducting sleeves 122, 122, and by the buoyancy of the float 118 and that of the air-containing hoses 121, 121.

The float 118 can be formed of a cellular substance such as sponge hard-rubber or other suitable molded cellular plastic, with an impervious skin of the same material, in accordance with well known practice, and the L-shaped air-passage 119 is in such relation to the hoses 121 that its mouth will be near its uppermost part in spite of the structure having a partial rotation about the axis of the roller as the float moves upward or downward with the surface of the liquid. To contribute further to that effect the float can be weighted, as by means of a weight 118ᵐ, on its side opposite the mouth of the air-passage 119, the C-spring shape of the resiliently flexible hoses 121 contributing to the ability of the weight 118ᵐ to influence the attitude of the float.

The parts constituting the axle, and the parts associated therewith inside of the roller, are such that the axle member 14 or 14ª, having such associated parts preassembled upon it, can be worked into the roller through an end hole of the latter without such end hole being excessively large, the bead defining the hole and the adjacent part of the wall of the roller being deformable from circular form and the hoses 21 and 121 also being deformable. The flange 11ª of the axle member can be "buttoned" through the hole in the adjacent end of the roller that is defined by the respective bead 10ª.

Preferably the sleeve 16 is preassembled with the axle member 14 or 14ª that is first projected into the roller and the other such axle member is thrust into the sleeve during or after its being projected into the roller. To facilitate the entrance of the axle members into the sleeve the latter is beveled as at 16ª, 16ª and the axle members are beveled as at 16ᵇ, 16ᵇ. The clamping-ring segments 12, 12 and their bolts 13, 13 are of course applied after the association of the parts within the roller has been completed.

It is desirable to provide the assembly with a stabilizing wheel 40, having a pneumatic tire 41, in association with each of the outwardly projecting end portions of the axle structure, to serve in the manner of outriggers for stabilizing the roller and for limiting its tilting on a hillside, for example, and to limit the flattening of the roller against the ground in case the roller contains a large amount of heavy liquid while having only a low cushioning air pressure per square inch. This condition is illustrated in Fig. 2, in which the roller is so extensively flattened against the roadway, the surface of which is represented by the horizontal line G, that the tires 41 are in contact with the roadway but not sustaining any substantial part of the weight of the roller and its cargo.

For rapid movement of the roller over a suitable roadway when the roller has been emptied of its cargo, it is desirable to have the roller carried chiefly or entirely by the axle structure, with the wheels supporting them, and for the best attainment of that purpose it is desirable that provision be made for lowering the axes of the wheels in relation to the axis of the roller.

A simple and convenient construction for providing that feature is shown in the drawings, in which the yoke 11 comprises, as the end portion of each of its arms, a thick, L-shaped metal plate 42 which is journaled at its elbow upon the roller's adjacent axle member, as at 43, and has the wheel's axle, 44, mounted in and projecting axially from an end portion of an arm 42ᵃ of the L-shaped plate which extends radially from the roller's axis.

When the yoke is in the position represented by Fig. 1 and the full-line showing of Fig. 2, the axes of the wheels are at a substantial distance above the axis of the roller, for sustention of the weight of the roller and its contents chiefly or entirely by the contact of the roller itself with the roadway, except as the wheels function on occasion as outriggers.

When it is desired to have the roller supported chiefly or entirely by the wheels, as above mentioned, the yoke 11 is turned over to the other side of the assembly, which lowers the wheels in relation to the roller, as indicated by the dotted line position of the right-hand wheel and the dotted line relative position of the ground, G, in Fig. 2, the lower portion of the roller concurrently assuming the shape and relative position indicated in dotted lines in Fig. 2.

It is believed that the mode of operation of the apparatus, and the steps of the method, are adequately presented in the above description.

Preferably the roller is given sufficient internal pressure, by reason of the quantity of liquid and/or air or other gas within it, to round it out to almost its maximum cross-sectional size, for ease of rolling it, but not such high pressure as would prevent it from locally yielding adequately for easing its passage over such roadway obstructions as are to be encountered.

By securing the thrust-bearing washers 24 and 16ᵃ against movement lengthwise of their respective axle members, the telescopic guide and stop sleeve 16 can be omitted, the axle members 14 and 14ᵃ nevertheless continuing to serve as stub axles providing respective fluid conduits from the interior to the exterior of the roller, assuming that the roller is given sufficient internal pressure to strengthen it against excessive movement of the stub axles out of alignment with each other.

Advantages of the crowned shape of the roller are that distension of the roller by internal fluid pressure does not so radically change its shape as to develop excessively localized strains in its flexible wall and that buckling or wrinkling of end-closure parts of the wall by flattening of the roller against the ground, or by the pressure of roadway obstructions, is avoided by the gradual curvature of the roller's wall in the region of the merging of its ground-contacting portion into its end-closure portions respectively.

Also a roadway projection can turn a dome-shaped part of the crowned wall "inside-out," to a re-entrant condition with relation to the normal shape of the roller, primarily by simple flexing of the wall and without great diversity of pulling of the fabric in different vertical planes such as must occur in a roller of similar construction but of cylindrical form.

The yoke 11, above referred to as "horizontal-propulsion means," is of course not intended to be limited to a pulling action as to its mode of operation. In the appended claims it is contemplated as being only one specific example of means for applying a propelling force to, or receiving a propelling force from, the axle members 14, 14ᵃ, in any one of various possible modes of operation that will be obvious, and the expression "horizontal-propulsion means" is used above and in the claims as meaning means for applying to or receiving from the roller an impelling force having a horizontal component, in any operation of the device in which it has a horizontal component of movement over a roadway or other terrain.

Also in the appended claims the word "soft-rubber" is intended to be inclusive of all natural or synthetic substances, having substantially the resilient deformability of vulcanized soft-rubber, that are embraced by the word "soft-rubber" in its common usage; and the expression "of large flow capacity" as applied to the means for conducting fluid into or out of the roller is used as meaning a flow capacity sufficiently large to make the slowness of filling or emptying the roller not a substantial factor of disadvantage in use of the roller as a cargo carrier.

Various modifications are possible without departure from the scope of the invention as defined in the appended claims.

I claim:

1. Apparatus for transporting a cargo fluid, said apparatus comprising a flexible-walled, fluid-distensible, ground-contacting roller for containing the cargo fluid, said roller comprising journal means at each of its ends, at least one of the said journal means being fixedly sealed to the flexible wall of the roller as an end-closure therefor and thus constrained to rotate therewith and having a fluid-conducting passage through it, horizontal-propulsion means in journaled relation to said journal means, means for closing said passage, a conduit within the roller, open at one of its ends to the interior of the roller and at its other end in communication with said passage, and annular rotary-seal means coupling the said conduit to the said passage, said rotary-seal means being in communication on each side of its sealing zone with the interior of the roller and thus having no communication with the atmosphere external to the roller when the said passage is closed by the said closing means, so that it is required to function as sealing means only during passage of fluid into or out of the roller.

2. Apparatus as defined in claim 1 in which the rotary-seal means comprises a self-energizing sealing ring.

3. Apparatus as defined in claim 1 in which the passage through the journal means is defined in part by an axle element extending into the roller and there formed with a side opening and in which the sealing means comprises a self-energizing sealing ring surrounding the said axle element.

4. Apparatus as defined in claim 1 and including wheel means associated with the open end portion of the defined conduit for running of the wheel means on the inner face of the flexible wall of the roller for positioning the said portion of the conduit in relation to the said wall.

5. Apparatus for transporting a cargo fluid, said apparatus comprising a flexible-walled, fluid-distensible, ground-contacting roller for containing the cargo fluid, said roller comprising journal means at each of its ends, each of said journal means being fixedly sealed to the flexible wall of the roller and thus constrained to rotate therewith and at least one of said journal means having a fluid-conducting passage through it, a conduit within the roller, open adjacent one of its ends to the interior of the roller and at its other end having rotary-seal communication with the said passage, and a float within the roller and attached to the said conduit adjacent the latter's first mentioned end for holding the open end portion of said conduit at a position determined by the liquid level in the roller.

6. Apparatus for transporting a cargo fluid, said apparatus comprising a flexible-walled, fluid-distensible, ground-contacting roller for containing the cargo fluid, said roller comprising an axle structure extending through and fixedly sealed to one end-wall of the roller and thus constrained to rotate therewith, a second axle structure extending through and fixedly sealed to the other end-wall of the roller and thus constrained to rotate therewith, the two said axle structures being in slidably-telescoped relation to each other, and horizontal-propulsion means journaled to the said axle structures.

7. Apparatus for transporting a cargo fluid, said apparatus comprising a flexible-walled, fluid-distensible, ground-contacting roller for containing the cargo fluid, means defining a fluid-conducting passage leading from the exterior of said roller and having within the roller a flexible part open to the interior of the roller at a position close to the radially outer limit of the said interior, and means defining a second fluid-conducting passage leading to the exterior of the roller from its interior, the last said means having within the roller a flexible part which is in communication with the said interior at a position close to the radially outer limit of the said interior but spaced, circumferentially of the roller, from the first said position, the said apparatus comprising respective means locally joined to the said flexible parts, substantially at their respective points of communication with the interior of the roller, for holding them at their defined relative positions circumferentially of the roller.

8. Apparatus for transporting a cargo fluid, said apparatus comprising a hollow, fluid-distensible roller having, for containing the fluid, a ground-contacting wall of fiber-reinforced soft-rubber, the cargo-containing chamber within the roller extending from the said wall substantially to the axis of the roller, and the said wall, when in unstrained condition, being curved inwardly, toward the ends of the axis of the roller, throughout the annular end parts of its annular ground-contacting area and of substantially uniform wall thickness and structure, so that it has uniform flexibility, throughout the said parts of the said area, journal means at each end of the roller and fixed to the flexible wall of the roller and thus constrained to rotate therewith, means of large flow capacity for conducting fluid into and out of the roller, and horizontal-propulsion means journaled to the said journal means exteriorly of the cargo-containing interior of the roller, their mating journal surfaces thus being not in communication with the said interior of the roller, the said means for conducting fluid into and out of the roller comprising a flexible part open to the interior of the roller at a position close to the wall of the roller at the radially outer limit of the said interior, and means locally joined to said flexible part substantially at its point of communication with the interior of the roller for holding it at its defined position in relation to the said wall.

References Cited in the file of this patent

UNITED STATES PATENTS

| | | |
|---|---|---|
| Re. 24,272 | Albee | Feb. 12, 1957 |
| 966,214 | Jenks | Aug. 2, 1910 |
| 1,886,367 | Biles | Nov. 8, 1932 |
| 2,187,147 | Englesson | Jan. 16, 1940 |
| 2,222,047 | Snyder | Nov. 19, 1940 |
| 2,307,429 | Steidinger | Jan. 5, 1943 |
| 2,323,495 | Steidinger | July 6, 1943 |
| 2,348,445 | Bayer | May 9, 1944 |
| 2,541,928 | Loomis | Feb. 13, 1951 |
| 2,548,190 | Arpin | Apr. 10, 1951 |
| 2,714,011 | Albee | July 26, 1955 |